United States Patent
Sugaya

(10) Patent No.: US 10,630,877 B2
(45) Date of Patent: Apr. 21, 2020

(54) SYSTEM, METHOD, AND PROGRAM FOR CALCULATING DISTANCE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/737,806

(22) PCT Filed: Feb. 28, 2017

(86) PCT No.: PCT/JP2017/007800
§ 371 (c)(1),
(2) Date: Dec. 19, 2017

(87) PCT Pub. No.: WO2018/158820
PCT Pub. Date: Sep. 7, 2018

(65) Prior Publication Data
US 2019/0379813 A1    Dec. 12, 2019

(51) Int. Cl.
*H04N 5/232* (2006.01)
*G06T 7/536* (2017.01)
*G01C 3/08* (2006.01)
*G06T 7/70* (2017.01)

(52) U.S. Cl.
CPC .............. *H04N 5/232* (2013.01); *G01C 3/08* (2013.01); *G06T 7/536* (2017.01)

(58) Field of Classification Search
CPC ........... H04N 5/232; G01C 3/08; G06T 7/536
See application file for complete search history.

(56) References Cited

U.S. PATENT DOCUMENTS

| | | | | |
|---|---|---|---|---|
| 6,130,705 A | * | 10/2000 | Lareau | G01C 3/08 348/144 |
| 7,015,967 B1 | * | 3/2006 | Kochi | G06T 5/006 348/144 |
| 9,797,719 B2 | * | 10/2017 | Nishita | G01C 3/08 |
| 2004/0046024 A1 | * | 3/2004 | Natsukari | G06K 1/121 235/454 |
| 2018/0180863 A1 | * | 6/2018 | Akishiba | G01N 21/9515 |
| 2019/0277753 A1 | * | 9/2019 | Waxman | G01J 3/06 |

FOREIGN PATENT DOCUMENTS

| | | |
|---|---|---|
| JP | 2000-321059 | 11/2000 |
| JP | 2004-053966 | 2/2004 |
| JP | 2006-027448 | 2/2006 |
| JP | 2013-127694 | 6/2013 |
| WO | 2013094526 | 6/2013 |

* cited by examiner

*Primary Examiner* — Howard D Brown, Jr.
(74) *Attorney, Agent, or Firm* — Lex IP Meister, PLLC

(57) ABSTRACT

The present invention is to provide a system to take an image efficiently at a measurement accuracy which the user desires without changing the zoom factor of the camera. The system for calculating a distance 1 of the present invention includes an airborne imaging device 2 and a controller 3. The control unit 40 of the airborne imaging device 2 performs the rectangular size acquisition module 41 and acquires the rectangular size of an object to be imaged that is computer analyzable. Then, the control unit 40 performs the distance calculation module 42 and calculates the distance between the object to be imaged and the imaging device based on the rectangular size acquired by the processing of the rectangular size acquisition module 41.

5 Claims, 9 Drawing Sheets

SYSTEM, METHOD, AND PROGRAM FOR CALCULATING DISTANCE

TECHNICAL FIELD

The present invention relates to a system, a method, and a program for calculating a distance.

BACKGROUND ART

The cost of taking images from unmanned air vehicles have been reduced than that from airplanes and helicopters. Moreover, unmanned air vehicles are capable to take images low in the air safely even in small places and approach a target to be imaged. Since they can provide high-quality still and moving images, unmanned air vehicles have been applied in many fields, for example, to check the maintenance of structures, check heights, and observe ground from a high altitude.

The method of taking images with an unmanned air vehicle, including measuring the distance between the airframe and an object to be imaged while the unmanned air vehicle is flying; determining the zoom factor of the camera based on the result; and imaging the object is proposed (for example, refer to Patent Document 1). According to this method, the camera installed in an unmanned air vehicle can accurately capture the image of an object to be imaged, sufficiently enlarge the image within the frame of the camera, and record the image as high-definition image data. Therefore, the method can be beneficially and effectively used to check the surface of high structures and disaster sites to considerably reduce the cost required for the checks, compared with past methods.

CITATION LIST

Patent Literature

Patent Document 1: JP 2006-027448A

SUMMARY OF INVENTION

This method is to fly an unmanned air vehicle at a height, measure the height, and determine the zoom factor of the camera based on the measured height. When the measurement accuracy which the user desires cannot be expected during flight even if the zoom factor of the camera is maximized, the height of the unmanned air vehicle must be decreased to measure the height and determine the zoom factor of the camera again. In that sense, there is still room for more improvement from the viewpoint of efficiency.

On the other hand, it is possible to surely take an image at a measurement accuracy which the user desires if the height of the unmanned air vehicle is reduced. However, if the height of the unmanned air vehicle is too small, the data amount of an image necessary to obtain the image of the entire area to be imaged becomes massive. This may affect the capacity of the battery, the processing performance of the controller, and the image capacity of the memory of an unmanned air vehicle. Especially, if the power from the installed battery is consumed and lacked, the air vehicle will be crashed and damaged. Therefore, the technology to reduce the consumption of the battery, the processing performance of the controller, and the image capacity of the memory of an unmanned air vehicle and quickly and accurately capture the whole area to be imaged is required.

Moreover, it is essential for the method described in Patent Document 1 to change the zoom factor of the camera. However, in a digital zoom that crops and enlarges the center of an image, the quality of the enlarged image is inferior to that of the image before digitally zoomed. Moreover, the optical zoom that changes the focal length of a lens is known. However, a zoom lens with variable focal length (1) is more expensive, (2) has a higher F value and tends to take a darker image, and (3) has a poorer image quality than a prime lens. Therefore, the system that is capable to provide an image taken at a measurement accuracy which the user desires without changing the zoom factor of the camera is required.

In view of such demand, an objective of the present invention is to provide a system to take an image efficiently at a measurement accuracy which the user desires without changing the zoom factor of the camera.

The first aspect of the present invention provides a system for calculating a distance, including:

a rectangular size acquisition unit that acquires the rectangular size of an object to be imaged that is computer analyzable; and a distance calculation unit that calculates the distance between the object to be imaged and an imaging device based on the rectangular size.

According to the first aspect of the present invention, the rectangular size acquisition unit acquires the rectangular size of an object to be imaged that is computer analyzable; and the distance calculation unit calculates the distance between the object to be imaged and an imaging device based on the rectangular size.

This enables the user to obtain the distance corresponding to the measurement accuracy (the rectangular size of an object to be imaged that is computer analyzable) which the user desires. Accordingly, the user only has to place the imaging device at the distance away from the object to be imaged. Therefore, the present invention is more efficient than conventional imaging methods in no need for the re-installation of the imaging device.

Moreover, this enables the user to image an object at a place farthest away from the object within the range of the measurement accuracy (the rectangular size of an object to be imaged that is computer analyzable) which the user desires. Accordingly, the amount of image data necessary to image the entire area of an object which the user desires to image is reduced. Therefore, the present invention can keep the consumption of the battery, the processing performance of the controller, and the image capacity of the memory of an unmanned air vehicle low.

Moreover, this allows the user not to change the zoom factor of the camera so that images with high quality can be provided reasonably.

Therefore, the present invention can provide a system to take an image efficiently at a measurement accuracy which the user desires without changing the zoom factor of the camera.

The second aspect of the present invention provides the system according to the first aspect of the present invention, in which the distance calculation unit calculates the distance between the object to be imaged and the imaging device based on the rectangular size and the resolution of the imaging device.

According to the second aspect of the present invention, the maximum area to be imaged can be calculated within the range of the measurement accuracy (the rectangular size of an object to be imaged that is computer analyzable) which the user desires based on the rectangular size and the resolution of the imaging device. Then, the distance between the object to be imaged and the imaging device can be calculated to obtain the maximum area of the image. Accordingly, the amount of image data necessary to image the entire area of an object which the user desires to image can be minimized. Therefore, the present invention can provide the system that is more efficient in the consumption of the battery, the processing performance of the controller, and the image capacity of the memory of an unmanned air vehicle.

The third aspect of the present invention provides the system according to the first or the second aspect of the present invention, further including an illumination acquisition unit that acquires solar illumination during imaging, in which the distance calculation unit calculates the distance between the object to be imaged and the imaging device based on the rectangular size and the solar illumination.

For example, since the illumination in the morning, evening, etc., is smaller than that in the daytime, the distance of the object to be imaged and the imaging device should be reduced in the morning, evening, etc. According to the third aspect of the present invention, since the distance between the object to be imaged and the imaging device is calculated based on the rectangular size and the illumination, the image quality is excellent even in the morning, evening, etc.

The fourth aspect of the present invention provides the system according to any one of the first to the third aspects of the present invention, further including a weather data acquisition unit that acquires weather data during imaging, in which the distance calculation unit calculates the distance between the object to be imaged and the imaging device based on the rectangular size and the weather data.

For example, the distance of the object to be imaged and the imaging device should be reduced in the rain more than that in the sunshine. According to the fourth aspect of the present invention, since the distance between the object to be imaged and the imaging device is calculated based on the rectangular size and the weather data, the image quality is excellent even with poor visibility in the rain.

The present invention can provide a system to take an image efficiently at a measurement accuracy which the user desires without changing the zoom factor of the camera.

DESCRIPTION OF EMBODIMENTS

Embodiments of the present invention will be described below with reference to the attached drawings. However, these are illustrative only, and the technological scope of the present invention is not limited thereto.

Configuration of System for Calculating a Distance 1

Figure 1:
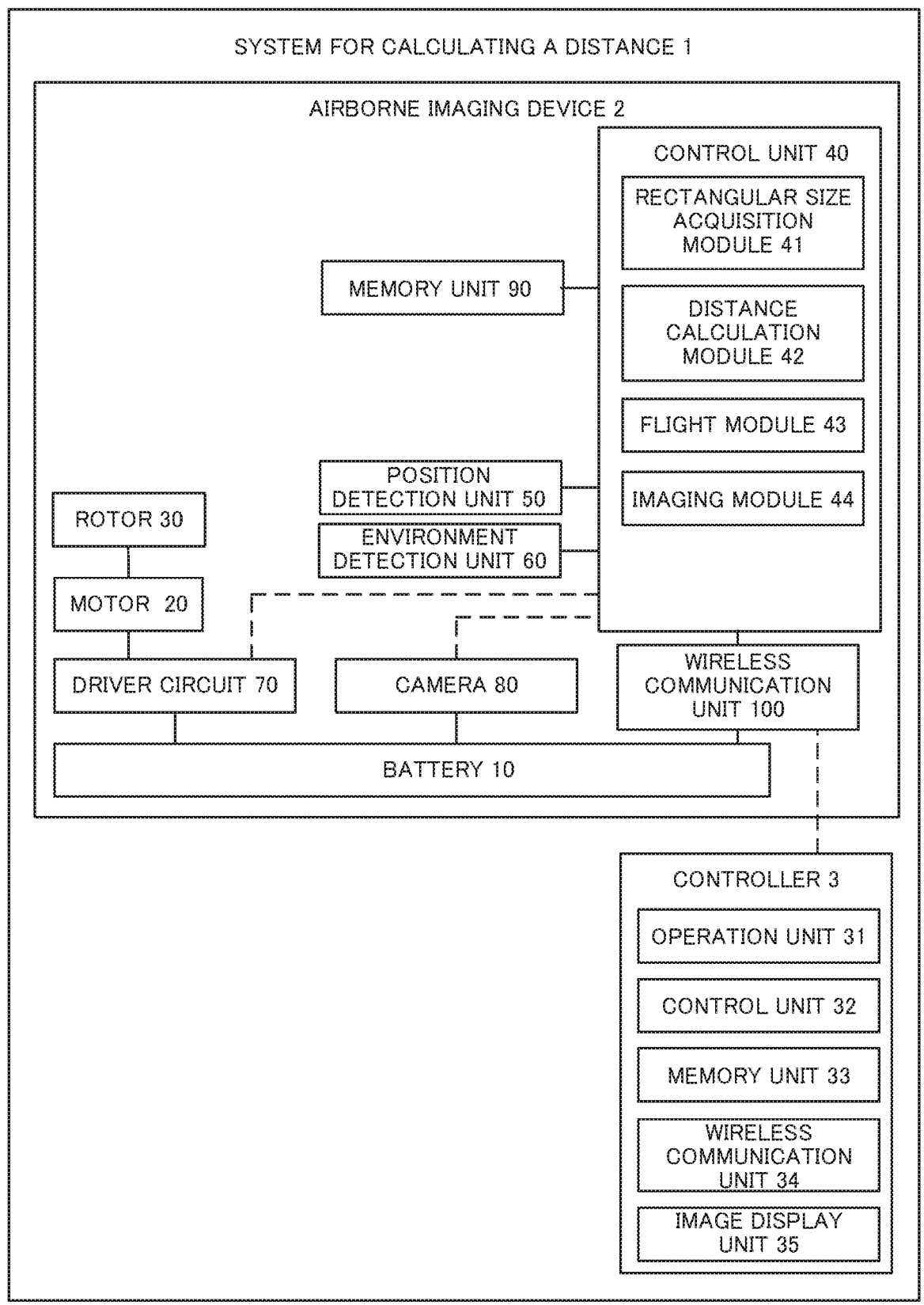
FIG. 1 shows a block diagram illustrating a hardware configuration and a software function of the system for calculating a distance 1 in an embodiment.

FIG. 1 shows a block diagram illustrating a hardware configuration and a software function of the system for calculating a distance 1 in an embodiment. The system for calculating a distance 1 is to calculate the appropriate distance between the object to be imaged and the imaging device. There may be a constant interval in the horizontal direction or the direction of gravitational force between the object to be imaged and the imaging device. In the former case, an image is taken on the ground, and in the latter case, from the sky by using an airborne imaging device. In this embodiment, the imaging device is an airborne imaging device 2, which images an object from the sky, but not limited thereto. The system of this embodiment may be used to calculate the appropriate horizontal distance between the object to be imaged and the imaging device on the ground.

The system for calculating a distance 1 includes an airborne imaging device 2 that images an object and a controller 3 that is connected with this airborne imaging device 2 through wireless communication to control the airborne imaging device 2.

Airborne Imaging Device 2

The airborne imaging device 2 is not limited in particular as long as it is capable to image an object from the sky. For example, the airborne imaging device 2 may be a radio control airplane or an unmanned air vehicle that is called a drone. In the following description, the airborne imaging device 2 is a drone.

The airborne imaging device 2 includes a battery 10 that functions as a power supply to the airborne imaging device 2, a motor 20 that works on electric power supplied from the battery 10, and a rotor 30 that rotates by the motor 20 to float and fly the airborne imaging device 2.

The airborne imaging device 2 also includes a control unit 40 that controls the operation of the airborne imaging device 2, a position detection unit 50 that provides position information on the airborne imaging device 2 to the control unit 40, an environment detection unit 60 that provides environment information on the weather, the illumination, etc., to the control unit 40, a driver circuit 70 that drives the motor 20 by control signals from the control unit 40, a camera 80 that images an object from the sky by control signals from the control unit 40, and a memory unit 90 that previously stores control programs, etc., executed by the microcomputer of the control unit 40 and stores images taken by the camera 80.

The airborne imaging device 2 also includes a wireless communication unit 100 that communicates with the controller 3 over the wireless.

These components are installed in the structure of the main body (e.g., frame) with a predetermined shape. For the structure of the main body (e.g., frame) with a predetermined shape, the one similar to a known drone only has to be used.

Battery 10

The battery 10 is a primary cell or a secondary cell, which supplies electric power to the components in the airborne imaging device 2. The battery 10 may be fixed to the airborne imaging device 20 or detachable.

Motor 20 and Rotor 30

The motor 20 functions as the driving source to rotate the rotor 30 by electric power supplied from the battery 10. Rotating the rotor 30 can float and fly the airborne imaging device 2.

Control Unit 40

The control unit 40 includes a CPU (Central Processing Unit), a RAM (Random Access Memory), and a ROM (Read Only Memory).

The control unit 40 reads a predetermined program to achieve a rectangular size acquisition module 41, a distance calculation module 42, a flight module 43, and an imaging module 44.

The control unit 40 controls the motor 20 in cooperation with the flight module 43 to control the flight (e.g., ascent, descent, and horizontal motion) of the airborne imaging device 2. Moreover, the control unit 40 controls the motor 20 by using the gyro (not shown) installed in the airborne imaging device 2 to control the attitude of the airborne imaging device 2.

Position Detection Unit 50

The position detection unit 50 is not limited in particular as long as it is capable to detect the latitude, the longitude, and the altitude of the airborne imaging device 2. For example, the position detection unit 50 includes a GPS (Global Positioning System).

Environment Detection Unit 60

The environment detection unit 60 is not limited in particular as long as it is capable to detect environment information on the weather, the illumination, etc., that affects imaging an object. For example, the altitude of the airborne imaging device 2 should be reduced in the rain more than that in the sunshine. Therefore, the weather is environment information that affects the imaging of an object. Examples of the device to detect the weather include a humidity sensor. Alternatively, the weather information may be acquired from a predetermined web site providing weather information through the wireless communication unit 100.

Moreover, since the illumination in the morning, evening, etc., is smaller than that in the daytime, the altitude of the airborne imaging device 2 should be reduced in the morning, evening, etc. Therefore, the illumination is environment information that affects the imaging of an object. Examples of the device to detect the illumination include an illumination sensor.

Driver Circuit 70

The driver circuit 70 has a function to apply a voltage specified from a control signal from the control unit 40 to the motor 20. This enables the driver circuit 70 to drive the motor 20 by control signals from the control unit 40.

Camera 80

The camera 80 has a function to convert (take) an optical image taken from the lens into image signals with the imaging element such as CCD or CMOS. The type of the camera 80 only has to be selected appropriately by the image analysis method. For example, to analyze an image based on the color of an object to be imaged (a visible light), an optical camera is suitable. For example, to analyze an image based on the heat quantity of an object to be imaged, an infrared camera is suitable. For example, to analyze an image in the night, a night-vision camera is suitable.

The camera 80 may take a still or moving image.

The still image can be preferable because it has a smaller capacity of imaging data than the moving image. However, in this embodiment, the altitude when the airborne imaging device 2 takes an image is increased as much as possible, and the capacity of imaging data is decreased as much as possible. Therefore, the present invention can keep the consumption of the battery, the processing performance of the controller, and the image capacity of the memory of the airborne imaging device 2 low even if the image taken by the camera 80 is a moving image. In the respect, this embodiment is characterized by no limitation to the types of the image taken by the camera 80. Thus, the camera 80 may take a still or moving image.

The view angle of the camera 80 is not limited in particular but is preferably increased as much as possible to set a higher altitude of the airborne imaging device 2 and reduce the capacity of imaging data as much as possible.

To set a higher altitude of the airborne imaging device 2, the resolution of an image is preferably as large as possible. For example, a 2K image has 1920 horizontal×1080 vertical pixels. For example, a 4K image has 3840 horizontal×2160 vertical pixels. For example, an 8K image has 7680 horizontal×4320 vertical pixels. In this embodiment, the image is a 4K image with a resolution of 3840 horizontal×2160 vertical pixels.

Memory Unit 90

The memory unit 90 is to store data and files and includes a data storage unit such as a hard disk, a semiconductor memory, a record medium, or a memory card. The memory unit 90 has a control program storage area (not shown) to previously store control programs, etc., executed by the microcomputer of the control unit 40 and an image data storage area (not shown) that stores images taken by the camera 80, optionally together with location data (including the latitude, the longitude, and the altitude of the point where the images were taken) detected by the position detection unit 50. The memory unit 90 also stores information on the view angle of the camera 80, information on the resolution of an image taken by the camera 80, etc.

Wireless Communication Unit 100

The wireless communication unit 100 is configured to be capable of wireless communication with the controller 3 to receive remote control signals from the controller 3.

Controller 3

The controller 3 has the function to control the airborne imaging device 2. The controller 3 includes an operation unit 31 that is used, for example, when the user controls the airborne imaging device 2, a control unit 32 that controls the operation of the controller 3, a memory unit 33 that previously stores control programs, etc., executed by the microcomputer of the control unit 32, a wireless communication unit 34 that communicates with the airborne imaging device 2 over the wireless, and an image display unit 35 that displays a predetermined image to the user.

The wireless communication unit 34 is configured to be capable of wireless communication with the airborne imaging device 2 to receive remote control signals from the airborne imaging device 2.

The wireless communication unit 34 preferably includes a device, such as a Wireless Fidelity (Wi-Fi®) enabled device complying with, for example, IEEE 802.11 that is capable to access a predetermined web site that provides weather information or map information.

The image display unit 35 may be integrated with or separated from an operating device that controls the airborne imaging device 2. The image display unit 35 integrated with an operating device can decrease the number of devices that the user uses and increase the convenience. Examples of the image display unit 35 separated from an operating device include mobile terminal devices such as a smart phone and a tablet terminal that are capable of wireless connection with the communication unit 100 of the airborne imaging device 2. The image display unit 35 separated from an operating device has the advantage of applicability in existing operating devices that do not have an image display unit 35.

Flow Chart Illustrating how to Calculate a Distance with the System for Calculating a Distance 1

Figure 2:
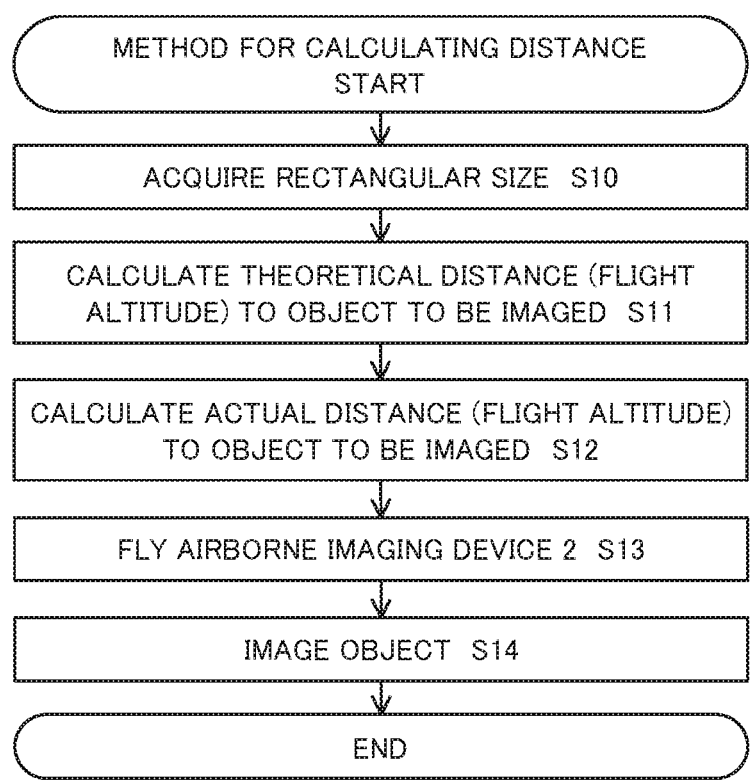
FIG. 2 shows a flow chart illustrating how to calculate a distance in the embodiment.

FIG. 2 shows a flow chart illustrating how to calculate a distance by using the system for calculating a distance 1. The tasks executed by the modules of the above-mentioned hardware and software will be described below.

Step S10: Acquire Rectangular Size

First, the system for calculating a distance 1 acquires the rectangular size (measurement accuracy that the user desires) of an object to be imaged that is computer analyzable.

The control unit 40 of the airborne imaging device 2 performs the rectangular size acquisition module 41. The control unit 40 transmits data on the image to be displayed when the rectangular size of an object to be imaged is acquired to the controller 3 through the wireless communication unit 100.

The control unit 32 of the controller 3 instructs the image display unit 35 to display the image generated from the data on the image that are transmitted from the airborne imaging device 2.

Figure 3:
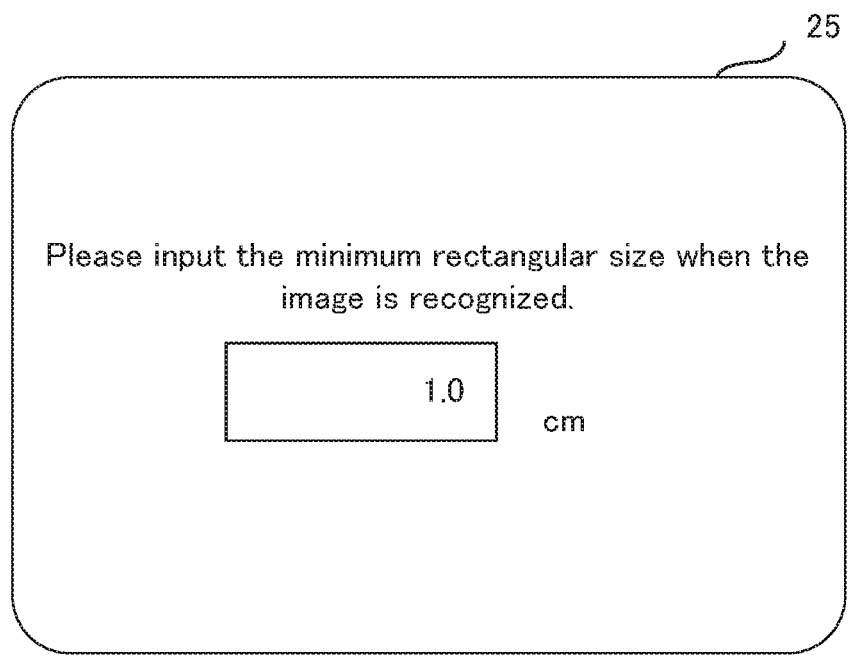
FIG. 3 shows an example of the image to be displayed on the image display unit 35 of the controller 3 when a rectangular size is acquired.

FIG. 3 shows one example of the display screen displayed on the image display unit 35 when a rectangular size is acquired. The upper part of the display screen shows "Please input the minimum rectangular size when the image is recognized." For example, the user inputs "1.0 cm" as the minimum rectangular size (measurement accuracy which the user desires) through the operation unit 31.

The control unit 32 transmits information input from the user to the airborne imaging device 2 through the wireless communication unit 34. Then, the control unit 40 of the airborne imaging device 2 sets information input from the user in the memory unit 90.

Step S11: Calculate Theoretical Distance (Flight Altitude) to Object to be Imaged The control unit 40 of the airborne imaging device 2 performs the distance calculation module 42. The control unit 40 calculates the suitable distance between an object to be imaged and the airborne imaging device 2 based on the rectangular size acquired in the step S10.

Figure 4:
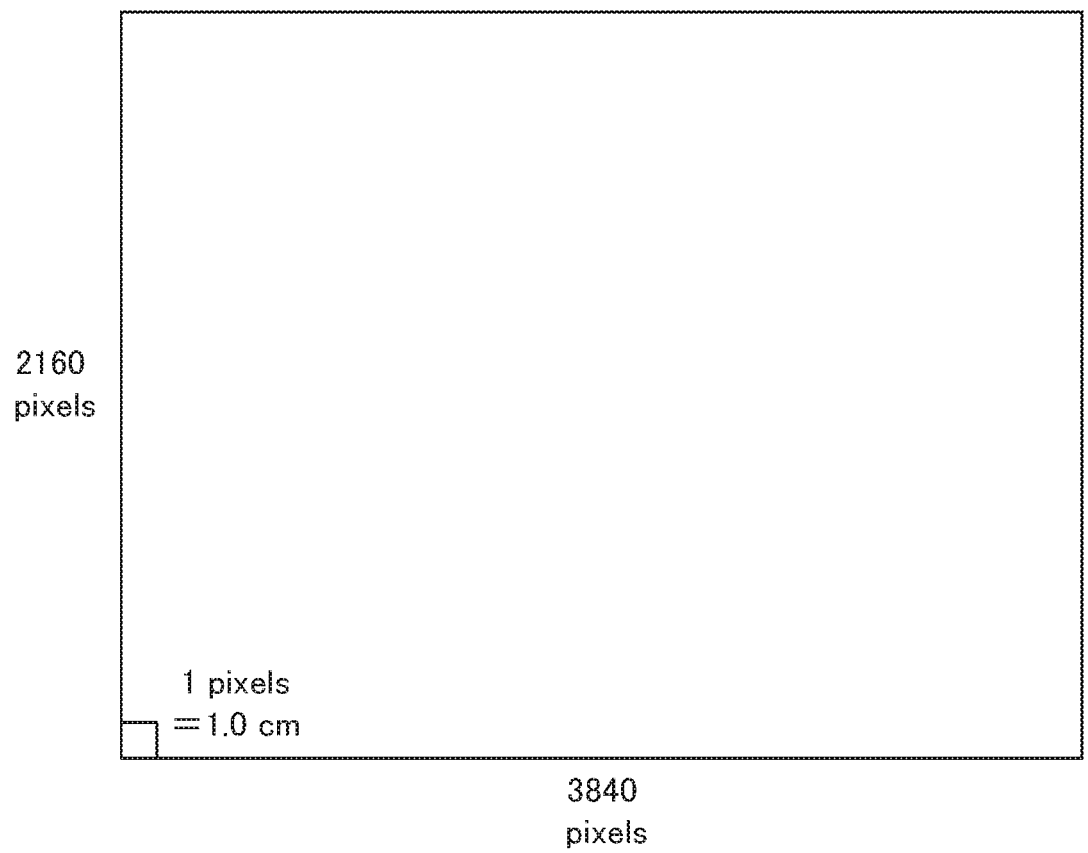
FIG. 4 shows a schematic pattern diagram to explain the pixels of an image which the camera 80 takes.

FIG. 4 shows a schematic pattern diagram to explain an image which the camera 80 takes. In this embodiment, the image is a 4K image with a resolution of 3840 horizontal× 2160 vertical pixels. Since "1.0 cm" was input as the image accuracy (size per pixel) in the display screen shown in FIG. 3, the imaging range of one image has a width of 1.0 cm×3840 pixels=38.4 m and a length of 1.0 cm×2160 pixels=21.6 m.

Figure 5:
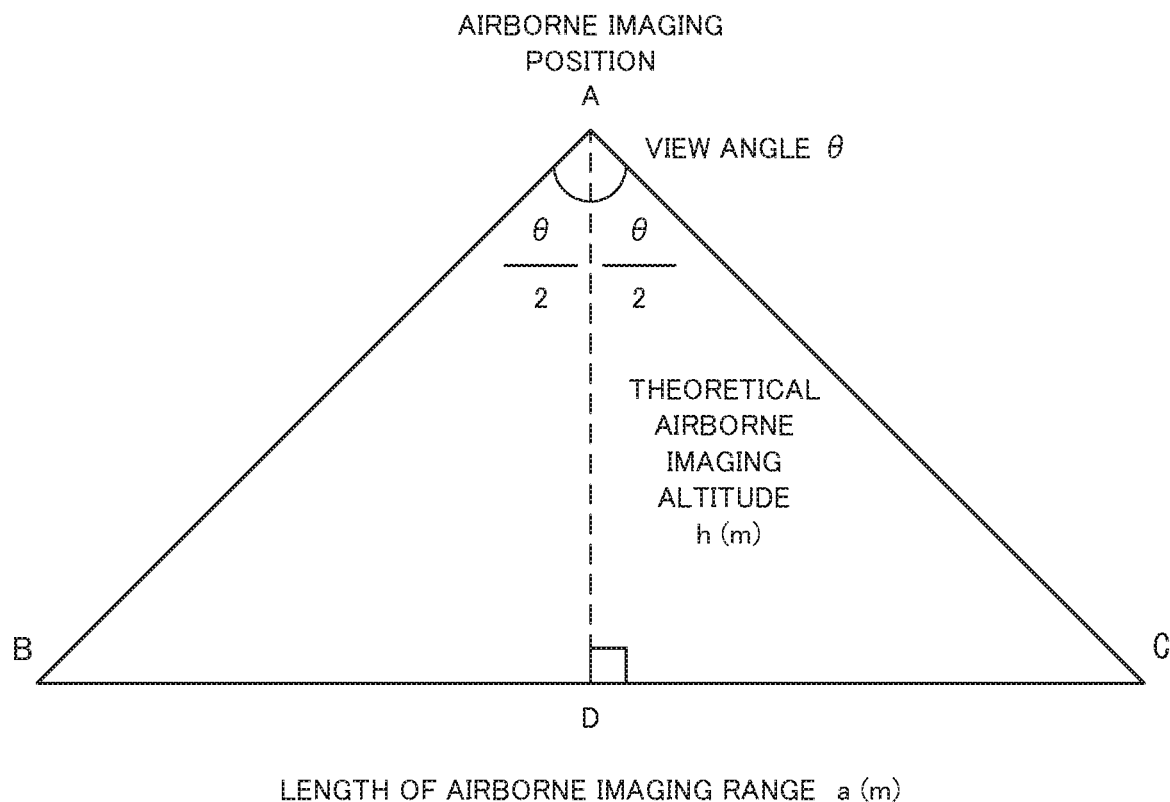
FIG. 5 shows a schematic pattern diagram to explain the imaging accuracy when the camera 80 provided in the airborne imaging device 2 takes an image from the sky.

FIG. 5 shows a pattern diagram illustrating the airborne imaging range of the airborne imaging device 2 located at the point A with an altitude of h (m). Since the triangle ABC has an isosceles triangle with AB=AC, the bisector of an angle A intersects with the base BC at the intersection D. Thus, the triangle DAC is a right triangle with the right angle D. If the view angle of the camera 80 is defined as θ and if the length (long side) of the airborne imaging range (of one image) is defined as a (m), tan(θ/2)=(a/2)/h is true. Therefore, the theoretical airborne imaging altitude h (m) is expressed in a/(2×tan(θ/2)).

The size of the view angle of the camera 80 is previously set to fall within a predetermined area of the memory unit 90. If the view angle of the camera 80 is 90 degrees, the control unit 40 of the airborne imaging device 2 sets 19.2 m obtained from formula: the length (long side) of the airborne imaging range (of one image) (38.4 m in this embodiment)/ (2×tan(90°/2)) as the theoretical airborne imaging altitude.

Step S12: Calculate Actual Distance (Flight Altitude) to Object to be Imaged

The imaging altitude of the airborne imaging device 2 is affected by environment information on the weather, the illumination, etc. For example, the altitude of the airborne imaging device 2 is preferably reduced in the rain more than that in the sunshine. Moreover, since the illumination in the morning, evening, etc., is smaller than that in the daytime, the altitude of the airborne imaging device 2 is preferably reduced in the morning, evening, etc.

Accordingly, the control unit 40 preferably adjusts the actual airborne imaging altitude based on the detection result from the environment detection unit 60.

The adjusted airborne imaging altitude is transmitted to the controller 3 through the wireless communication unit 100.

The control unit 32 of the controller 3 instructs the image display unit 35 to display the adjusted airborne imaging altitude and the imaging area of one image.

Figure 6:
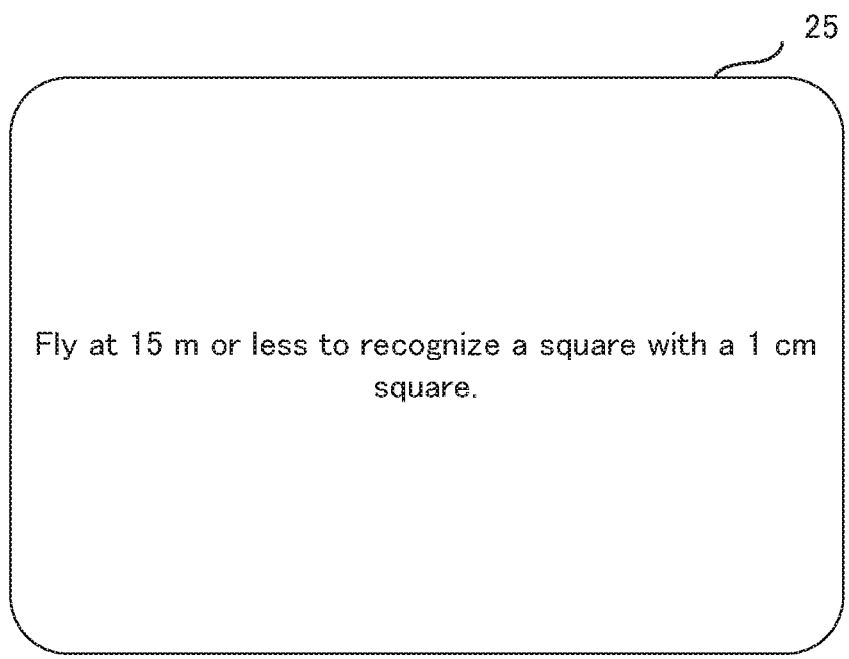
FIG. 6 shows an example of the image to be displayed on the image display unit 35 of the controller 3.

FIG. 6 shows one example of the display screen on the image display unit 35. The display screen shows "Fly at 15 m or less to recognize a square with a 1 cm square." This description clearly shows that the altitude of the airborne imaging device 2 only has to be adjusted to 15 m or less to analyze the image with a computer at the measurement accuracy which the user desires.

Step S13: Fly Airborne Imaging Device 2

The user operates the operation unit 31 of the controller 3, following the instruction shown in FIG. 6. The operation information is transmitted from the control unit 32 to the airborne imaging device 2 through the wireless communication unit 34.

The control unit 40 of the airborne imaging device 2 performs the flight module 43 to control the motor 20 to control the flight (e.g., ascent, descent, and horizontal motion) of the airborne imaging device 2. Moreover, the control unit 40 controls the motor 20 by using the gyro (not shown) installed in the airborne imaging device 2 to control the attitude of the airborne imaging device 2.

Figure 7:
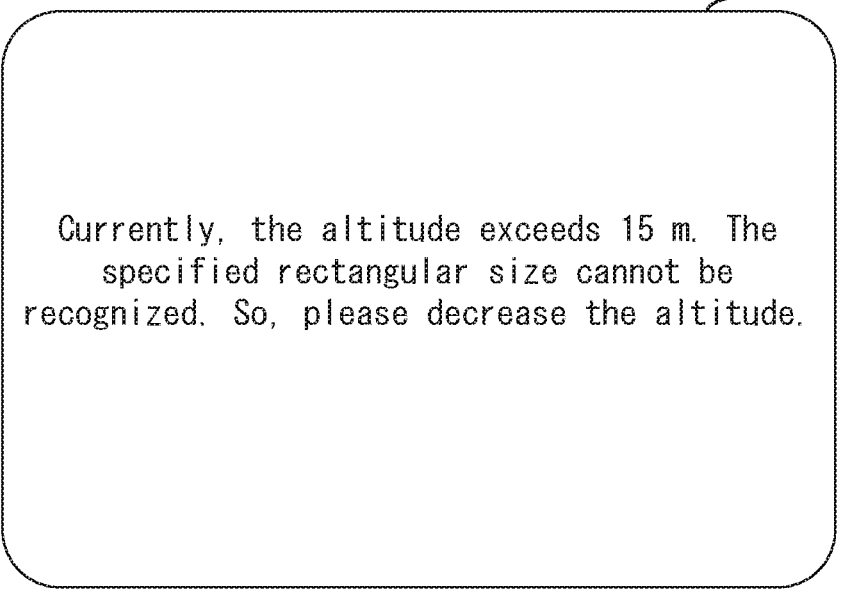
FIG. 7 shows an example of the image to be displayed on the image display unit 35 of the controller 3 when the change of the imaging condition is acquired.

If the flight altitude is higher than the set altitude, the control unit 40 preferably transmits information indicating that the flight altitude is higher than the set altitude to the controller 3 through the wireless communication unit 100. Accordingly, as shown in FIG. 7, the controller 3 can display "Currently, the altitude exceeds 15 m. The specified rectangular size cannot be recognized. So, please decrease the altitude," for example.

Figure 8:
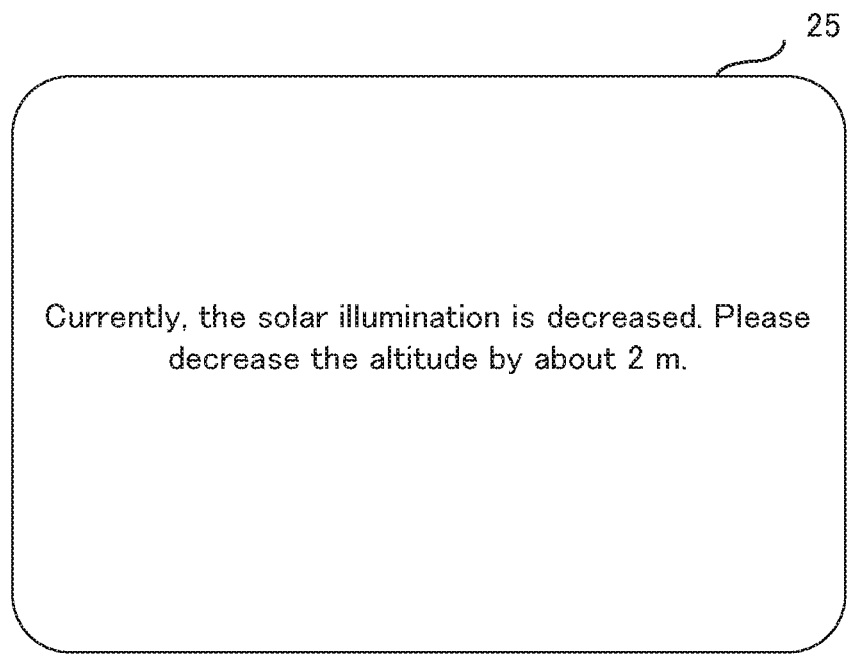
FIG. 8 shows another example of the image to be displayed on the image display unit 35 of the controller 3 when the change of the imaging condition is acquired.

Moreover, the control unit 40 preferably transmits information to re-adjust the actual airborne imaging altitude to the controller 3 through the wireless communication unit 100 according to the change in the detection result from the environment detection unit 60. Accordingly, as shown in FIG. 8, the controller 3 can display "Currently, the solar illumination is decreased. Please decrease the altitude by about 2 m," for example.

Step S14: Image Object

The control unit 40 of the airborne imaging device 2 performs the imaging module 44 to instruct the camera 80 to take an image.

The airborne imaging device 2 flies, following the instruction shown in FIGS. 6 to 8. For example, if the airborne imaging device 2 flies, following the instruction shown in FIG. 6, the image taken by the camera 80 corresponds to an image collectively taken at an altitude of 15 m in the area with a width of 30 meters and a length of 17 meters.

Although not required, the image is preferably stored in the image data storage area 93 of the memory unit 90 together with the location data (data on the altitude, the longitude, and the altitude of the point where the image was taken) detected by the position detection unit 50 when the camera 80 took the image to improve the convenience of the image analysis.

Operation and Working-Effect of the Present Invention

According to the present invention described in this embodiment, the control unit 40 of the airborne imaging device 2 performs the rectangular size acquisition module 41 to acquire the rectangular size of an object to be imaged that is computer analyzable. Then, the control unit 40 performs the distance calculation module 42 to calculate the distance between the object to be imaged and the imaging device based on the rectangular size acquired by the processing of the rectangular size acquisition module 41.

This enables the user to obtain the distance corresponding to the measurement accuracy (rectangular size of an object to be imaged that is computer analyzable) which the user desires. Accordingly, the user only has to place the airborne imaging device 2 at the distance away from the object to be imaged. Therefore, the present invention described in this embodiment is more efficient than conventional imaging methods in no need for the re-installation of the airborne imaging device 2.

Moreover, this enables the user to image an object at a place farthest away from the object within the range of the measurement accuracy (the rectangular size of an object to be imaged that is computer analyzable) which the user desires. Accordingly, the amount of image data necessary to image the entire area of an object which the user desires to image is reduced. Therefore, the present invention can keep the consumption of the battery, the processing performance of the controller, and the image capacity of the memory of an unmanned air vehicle low.

Moreover, this allows the user not to change the zoom factor of the camera so that images with high quality can be provided reasonably.

Therefore, the present invention described in this embodiment can provide a system to take an image efficiently at a measurement accuracy which the user desires without changing the zoom factor of the camera.

The control unit 40 preferably calculates the distance between the object to be imaged and the airborne imaging device 2 based on the rectangular size acquired by the processing of the rectangular size acquisition module 41 and the resolution of the camera 80 provided in the airborne imaging device 2.

Accordingly, the maximum area to be imaged can be calculated within the range of the measurement accuracy (the rectangular size of an object to be imaged that is computer analyzable) which the user desires based on the rectangular size and the resolution of the imaging device. Then, the distance between the object to be imaged and the airborne imaging device 2 can be calculated to obtain the maximum area of the image. Accordingly, the amount of image data necessary to image the entire area of an object which the user desires to image can be minimized. Therefore, the present invention can provide the system for calculating a distance 1 that is more efficient in the consumption of the battery, the processing performance of the controller, and the image capacity of the memory of the airborne imaging device 2.

Moreover, the control unit 40 preferably acquires the solar illumination during imaging and calculates the distance between the object to be imaged and the airborne imaging device 2 based on the rectangular size acquired by the processing of the rectangular size acquisition module 41 and the solar illumination during imaging.

For example, since the illumination in the morning, evening, etc., is smaller than that in the daytime, the distance of the object to be imaged and the imaging device should be reduced in the morning, evening, etc. According to the present invention described in this embodiment, since the distance between the object to be imaged and the airborne imaging device 2 is calculated based on the rectangular size and the illumination, the image quality is excellent even in the morning, evening, etc.

Moreover, the control unit 40 preferably acquires the weather data during imaging and calculates the distance between the object to be imaged and the airborne imaging device 2 based on the rectangular size acquired by the processing of the rectangular size acquisition module 41 and the weather data.

For example, the distance of the object to be imaged and the airborne imaging device 2 should be reduced in the rain more than that in the sunshine. According to the present invention described in this embodiment, since the distance between the object to be imaged and the airborne imaging device 2 is calculated based on the rectangular size and the weather data, the image quality is excellent even with poor visibility in the rain.

Variations

Figure 9:
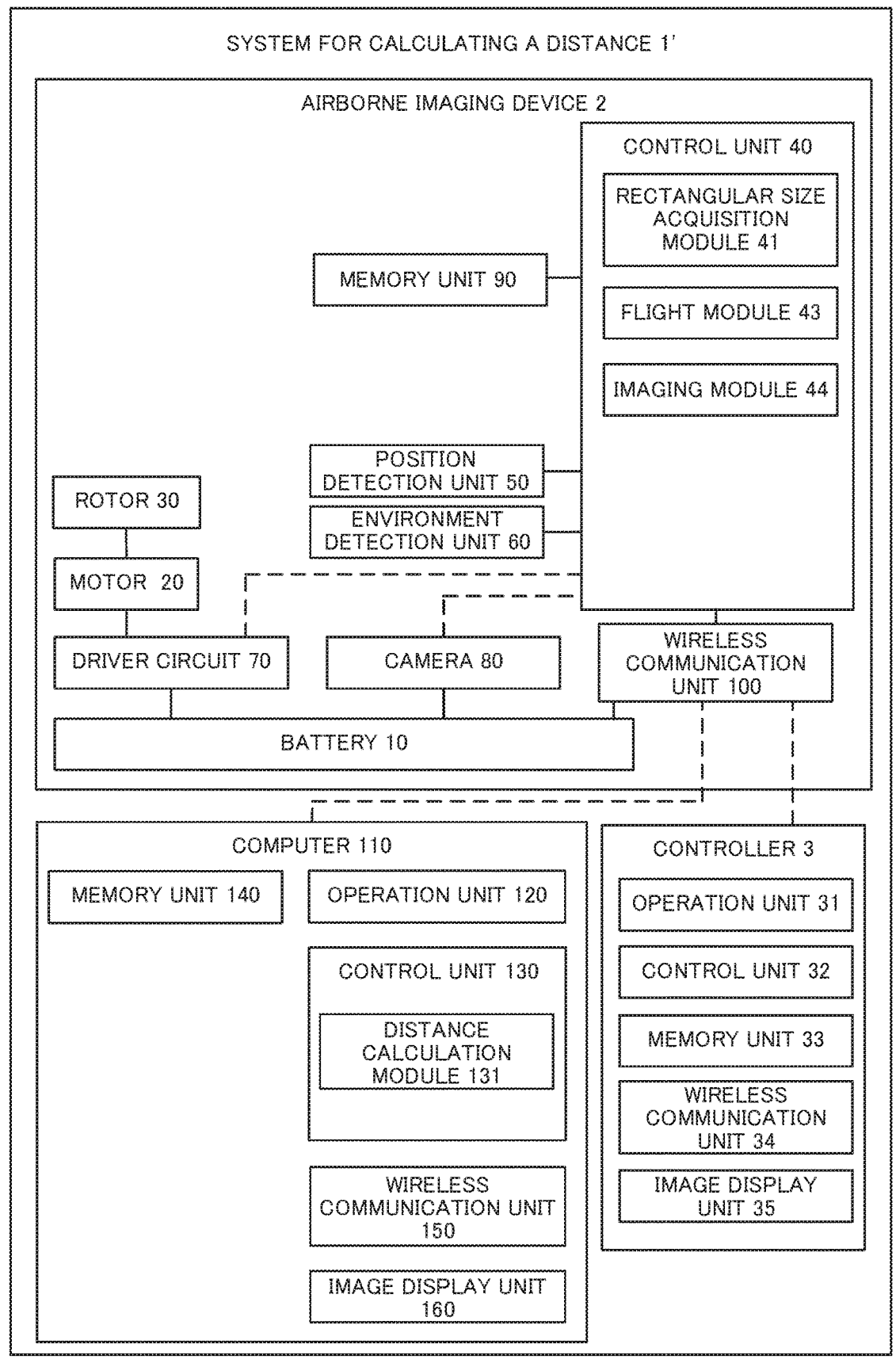
FIG. 9 shows a block diagram illustrating a hardware configuration and a software function of the system for calculating a distance 1' in a variation.

FIG. 9 schematically shows the configuration of the system for calculating a distance 1' according to a variation of the system for calculating a distance 1 described in this embodiment.

The same reference signs as those shown in FIG. 1 have the same configurations corresponding to those of the system for calculating a distance 1 described in this embodiment.

The system for calculating a distance 1' of this variation is different from the system for calculating a distance 1 in that the system for calculating a distance 1' further includes a computer 110 in addition to the components of the system for calculating a distance 1 to relocate the function of the distance calculation module 42 performed by the control unit 40 of the airborne imaging device 2 to the computer 110. This enables the computer 110 to function like a cloud device. Therefore, the system for calculating a distance 1' can more reduce the consumption of the battery 10, the processing performance of the control unit 40, and the image capacity of the memory unit 90 of the airborne imaging device 2.

The components of the computer 110 are expressed in the same way as those of the system for calculating a distance 1 of this embodiment. The components have the same functions corresponding to those described in the system for calculating a distance 1 of this embodiment.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for calculating a distance
10 Battery
20 Motor
30 Rotor
40 Control unit
41 Rectangular size acquisition module
42 Distance calculation module
43 Flight module
44 Imaging module
50 Position detection unit
60 Environment detection unit
70 Driver circuit
80 Camera
90 Memory unit
100 Wireless communication unit

What is claimed is:

1. A system for calculating a distance, comprising:
an airborne imaging device; and
a computer that is communicatively connected with the airborne imaging device,
wherein the airborne imaging device comprises:
    a rectangular size acquisition unit that acquires a rectangular size of an object to be imaged that is computer-analyzable;
    a distance output unit that outputs a distance between the object to be imaged and the airborne imaging device; and
    a weather data acquisition unit that acquires weather data during imaging,
wherein the computer comprises:
    a distance calculation unit that calculates the distance based on the rectangular size; and
    a transmission unit that transmits distance output information to the airborne imaging device to have the distance output unit to output the distance calculated by the distance calculation unit,
wherein the distance calculation unit calculates the distance between the object to be imaged and the airborne imaging device based on the rectangular size and the weather data.

2. The system according to claim 1, wherein the distance calculation unit calculates the distance between the object to be imaged and the airborne imaging device based on the rectangular size and the resolution of the airborne imaging device.

3. The system according to claim 1, wherein the airborne imaging device further comprises an illumination acquisition unit that acquires solar illumination during imaging, wherein the distance calculation unit calculates the distance between the object to be imaged and the airborne imaging device based on the rectangular size and the solar illumination.

4. A method performed by an airborne imaging device, the method comprising:
    acquiring a rectangular size of an object to be imaged that is computer-analyzable;
    acquiring weather data during imaging; and
    calculating a distance between the object to be imaged and the airborne imaging device based on the rectangular size and the weather data.

5. A non-transitory computer-readable medium that stores a program for causing an airborne imaging device to execute:
    acquiring a rectangular size of an object to be imaged that is computer-analyzable;
    acquiring weather data during imaging; and
    calculating a distance between the object to be imaged and the airborne imaging device based on the rectangular size and the weather data.

* * * * *